United States Patent Office 3,663,570
Patented May 16, 1972

3,663,570
COUMARIN DERIVATIVES
Yasunobu Sato, Yutaka Kobayashi, Hiromu Takagi, Seiji Kumakura, Koichi Nakayama, and Takeshi Oshima, Tokyo, Japan, assignors to Sankyo Company Limited, Tokyo, Japan
No Drawing. Filed Apr. 23, 1970, Ser. No. 31,380
Claims priority, application Japan, Apr. 28, 1969, 44/32,578; Oct. 27, 1969, 44/85,820
Int. Cl. C07d 7/26
U.S. Cl. 260—343.2 R    11 Claims

ABSTRACT OF THE DISCLOSURE

The application is directed to a novel coumarin derivative having the formula

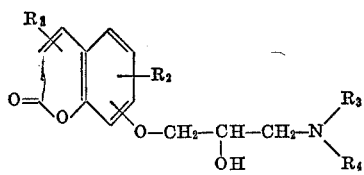

wherein $R_1$, $R_2$ and $R_3$ may be the same or different and each represents a hydrogen atom or a lower alkyl group, $R_4$ represents a lower alkyl group and the group

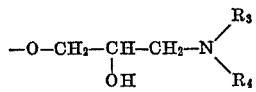

is substituted in 5- or 8-position of the coumarin ring and a process for the preparation thereof.

The coumarin derivative is useful as β-adrenergic blocking agents and prepared by reacting compound having the formula

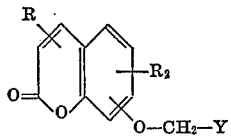

wherein $R_1$ and $R_2$ are the same as above, Y represents a group

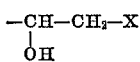

(wherein X represents a halogen atom) or 2-oxiranyl group and the group —O—CH$_2$—Y is substituted in 5- or 8-position of the coumarin ring with an amine having the formula

wherein $R_3$ and $R_4$ are the same as above in the presence or absence of a solvent.

---

This invention relates to novel coumarin derivatives and a novel process for the preparation thereof.

More particularly, this invention relates to novel coumarin derivatives having the formula

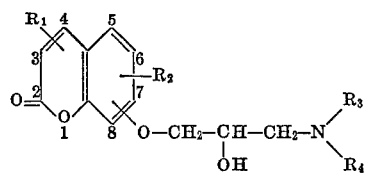

wherein $R_1$, $R_2$ and $R_3$ may be the same or different and each represents a hydrogen atom or a lower alkyl group, $R_4$ represents a lower alkyl group and the group

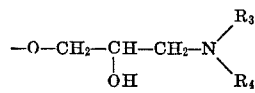

is substituted in 5- or 8-position of the coumarin ring and a process for the preparation thereof.

In the above Formula I, the lower alkyl group can be a straight or branched alkyl group such as methyl, ethyl, n-propyl, isopropyl, n-butyl, isobutyl, t-butyl and the like. $R_1$ and $R_2$ can be substituted in 3-, 4-, 5-, 6-, 7- or 8-position of the coumarin ring except the position in which the group

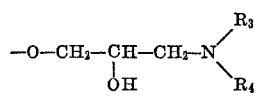

is substituted.

In the present invention, especially preferable compounds are a coumarin derivative having the formula

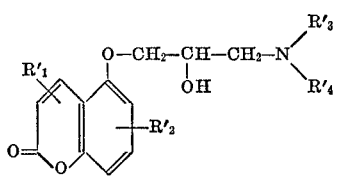

wherein $R'_1$, $R'_2$ and $R'_4$ may be the same or different and each represents a lower alkyl group and $R'_3$ represents a hydrogen atom or a lower alkyl group.

Heretofore, it has been known that some benzodioxans, benzofurans and chromans substituted with the group

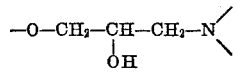

have a β-adrenergic blocking action (Japanese patent publication No. 20,343/66 corresponding to Netherlands patent application No. 6408650).

As the result of various studies about β-adrenergic blocking agents, we have found that the degree of the action is greatly affected by not only a kind of substituents but also a kind of heterocyclic ring and a position of substituents in case of substituted heterocyclic compounds and completed the present invention based upon this finding.

All of the compounds (I) prepared by the present invention are novel and useful as β-adrenergic blocking agents which have low toxicities and few side effects.

Therefore, it is an object of this invention to provide novel coumarin derivatives (I) and the acid addition salts thereof having a β-adrenergic blocking activity.

Another object of this invention is to provide a novel process for preparing said coumarin derivatives. In the present invention, the coumarin derivatives represented by the above Formula I are intended to include all of optical isomers which can exist.

According to the present invention, the coumarin derivatives (I) can be prepared by reacting a compound having the formula

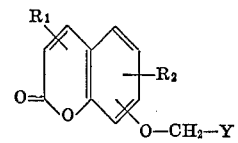

(II)

wherein $R_1$ and $R_2$ are the same as above, Y represents a group $$-CH-CH_2-X$$
$$\phantom{-CH-}|$$
$$\phantom{-CH-}OH$$

wherein X represents a halogen atom) or 2-oxiranyl group and the group —O—$CH_2$—Y is substituted in 5- or 8-position of the coumarin ring with an amine having the formula $$HN\begin{matrix}R_3\\ \diagdown\\ R_4\end{matrix} \qquad (III)$$

wherein $R_3$ and $R_4$ are the same as above.

The reaction of the present invention is carried out by contacting the compound (II) with the compound (III). Preferably the reaction is carried out in an inert solvent under heating in order to conduct the reaction more smoothly. As the reaction solvent, there may be satisfactorily employed any of the solvents that would not adversely affect the reaction. Representative examples of these solvents include a lower alkanol such as methanol or ethanol, ether such as tetrahydrofuran or dioxane, a hydrocarbon such as benzene or toluene, a halogenated hydrocarbon such as dichloroethane or tetrachloroethane, dimethylformamide and the like. Usually there may be employed ethanol.

The reaction is preferably carried out at about 100° C., but may be carried out at a lower or higher temperature. Although the reaction period may be varied mainly depending upon the reaction temperature applied and the kind of reaction solvent employed, it is usually from about 5 hours to about 24 hours.

After completion of the reaction, the desired compound (I) may be recovered from the reaction mixture by a conventional means. For instance, the reaction product may be recovered by removal of the reaction solvent through evaporation and may be purified by recrystallization of the residue when it is crystalline substance or by chromatographic treatment of the residue when it is oily substance. The oily residue may be also purified by reacting said residue with an acid to give a crystalline and pharmaceutically acceptable non-toxic acid addition salt such as hydrochloride and recrystallizing the salt.

In the present reaction, there is obtained a hydrohalogenic acid addition salt of the coumarin derivative when Y represents the group $$-CH-CH_2-X$$
$$\phantom{-CH-}|$$
$$\phantom{-CH-}OH$$

wherein X is the same as the above.

The acid addition salts thus obtained are useful compounds in accordance with the invention and are, therefore, contemplated as an embodiment of the invention.

Said acid addition salt, if desired, may be easily converted to a free form by adding an aqueous solution of an alkaline substance such as sodium carbonate, potassium carbonate and the like.

The compound (II) employed as a starting material in this invention is novel and prepared by reacting a hydroxycoumarin derivative having the formula (IV)

wherein $R_1$ and $R_2$ are the same as above and the hydroxy group is substituted in 5- or 8-position of the coumarin ring with an epihalogenohydrin in the presence of a base or by reacting the epoxy compound thus obtained with hydrogen halogenide.

The process for preparation of the compound (II) is concretely shown below.

PREPARATION OF STARTING MATERIALS (1) Preparation of 5-(2,3-epoxypropoxy)coumarin A mixture of 0.50 g. of 5-hydroxycoumarin, 1.67 g. of potassium carbonate, 2.22 g. of epibromohydrin and 15 ml. of methyl ethyl ketone is heated under reflux for 15 hours with stirring. The reaction mixture is filtrated while hot and the filtrate is concentrated under reduced pressure to dryness. The residue is recrystallized from ethanol to give 0.50 g. of the desired product melting at 120–122° C.

(2) Preparation of 8-(2,3-epoxypropoxy)coumarin

A mixture of 2.3 g. of 8-hydroxycoumarin, 7.7 g. of potassium carbonate, 9.6 g. of epibromohydrin and 50 ml. of methyl ethyl ketone is heated under reflux for 12 hours. The reaction mixture is filtrated while hot and the filtrate is concentrated under reduced pressure to dryness. The residue is recrystallized from ethanol to give 1 g. of desired product melting at 94–95° C.

(3) Preparation of 8-(2-hydroxy-3-chloropropoxy)coumarin

In 120 ml. of methyl ethyl ketone are dissolved 10 g. of 8-(2,3-epoxypropoxy)coumarin and the resulting solution is saturated with dry hydrogen chloride and left overnight. The reaction mixture is concentrated under reduced pressure to dryness. The residue is recrystallized from ethanol to give 10.2 g. of the desired product melting at 138.5–139.5° C.

(4) Preparation of 3-methyl-8-(2,3-epoxypropoxy)coumarin

A mixture of 3.6 g. of 3-methyl-8-hydroxycoumarin, 8 g. of potassium carbonate, 8 g. of epibromohydrin and 50 ml. of methyl ethyl ketone is heated under reflux with stirring for 12 hours. The reaction mixture is filtrated while hot and the filtrate is concentrated under reduced presure to dryness. The residue is recrystallized from ethanol to give 3 g. of desired product melting at 108–109° C.

(5) Preparation of 3-methyl-8-(2-hydroxy-3-chloropropoxy)coumarin

In 20 ml. of methyl ethyl ketone are dissolved 0.7 g. of 3-methyl-8-(2,3-epoxypropoxy)coumarin and the resulting solution is saturated with dry hydrogen chloride and left overnight. The reaction mixture is concentrated under reduced pressure to dryness. The residue is recrystallized from ethanol to give 3 g. of the desired product melting at 165–166° C.

(6) Preparation of 5-(2,3-epoxypropoxy)-4,7-dimethylcoumarin

A mixture of 9.5 g. of 5-hydroxy-4,7-dimethylcoumarin, 15 g. of epibromohydrin, 15 g. of potassium carbonate, 20 ml. of dimethylformamide and 100 ml. of methyl ethyl ketone is heated under reflux with stirring for 10 hours. After completion of the reaction, the reaction mixture is filtrated while hot and the filtrate is concentrated under reduced pressure to dryness. The residue is recrystallized from ethanol to give 8.6 g. of the desired product melting at 141–142° C.

(7) Preparation of 5-(2-hydroxy-3-chloropropoxy)-4,7-dimethylcoumarin

A solution of 10 g. of 5-(2,3-epoxypropoxy)-4,7-dimethylcoumarin in 150 ml. of methyl ethyl ketone is saturated with dry hydrogen chloride and left overnight. The reaction mixture is concentrated under reduced pressure to dryness to give the desired product as crystals.

The following experimental data will evidently show that the coumarin derivatives of the present invention exhibit very potent β-adrenergic activities and have low toxicities.

BLOCKADE OF THE CHRONOTROPIC RESPONSE TO ISOPROTERENOL (PHARMACOLOGICAL HALF-LIFE)

Method: The modified method of Black et al. (Brit. J. Pharmacol. Chemother., 25, 577–591, 1965) was employed. Adult dogs of both sexes (8 to 14 kg.) were anaesthetized with sodium pentobarbital, 30 mg./kg. i.v., both vagi sectioned, a femoral artery and a femoral vein cannulated for record of blood pressure and injection of drugs respectively. Heart rate was continuously recorded with cardiotachogram triggered by the pressure pulse. In control experiments 0.3 µg./kg. isoproterenol caused reproducible chronotropic responses. Maximum blocking action and the pharmacological half-life were determined by recording the isoproterenol responses before and 3 min. and 20 min. intervals after the injection of 100 µg./kg. β-blocker.

| Compound: | Maximum blocking action (at 3 min.), percent | Half-life 50% block, min. |
|---|---|---|
| A | *88 | *40 |
| B | 79 | 35 |
| C | 96 | 100 |
| D | 95 | 100 |
| E | 92 | 60 |
| Propranolol | 73 | 55 |

*Means results of five experiments with each agent.

ACUTE TOXICITY TO MICE ($LD_{50}$)

Method: $LD_{50}$'s were determined in 6 groups of 6 aggregated male mice weighing 20±2 g. by i.v. route 7 days after administration. The $LD_{50}$'s and their confidence limits were calculated according to Litchfield and Wilcoxon (J. Pharmacol. Exp. Ther., 96, 99–113, 1949).

| Compound: | $LD_{50}$ (mg./kg.) | Range with 95% confidence |
|---|---|---|
| A | 48.0 | 41.0–56.2 |
| B | 43.0 | 34.5–53.8 |
| C | 35.5 | 29.1–43.3 |
| D | 45.5 | 42.5–48.7 |
| E | 33.0 | 26.4–41.3 |
| Propranolol | 28.0 | 24.1–32.5 |

ANTIARRHYTHMIC ACTION (OUABAIN-INDUCED ARRHYTHMIA)

Method: Ouabain-induced ventricular tachycardia was produced in dogs anaesthetized with sodium pentobarbital, 30 mg./kg. i.v. by the modified method of Lucchessi and Hardman (J. Pharmacol. Exp. Ther., 132, 372–381, 1961).

| Compound: | No. of recoveries of sinus rhythm after 10 mg./kg. i.v. infusion |
|---|---|
| A | [1] 3/4 |
| B | — |
| C | 2/4 |
| D | 4/4 |
| E | 4/4 |
| Propranolol | 4/4 |

[1] No. of recoveries/No. of expts.

NOTE.—Compound A: 8-(2-hydroxy-3-isopropylaminopropoxy)coumarin. Compound B: 5-(2-hydroxy-3-isopropylaminopropoxy)coumarin. Compound C: 8-(2-hydroxy-3-t-butylaminopropoxy)coumarin. Compound D: 5-methyl-8-(2-hydroxy-3-t-butylaminopropoxy)coumarin hydrochloride. Compound E: 5-methyl-8-(2-hydroxy-3-isopropylaminopropoxy)coumarin hydrochloride.

The coumarin derivatives (I) have a β-adrenergic blocking action as mentioned hereinabove and may be employed for a treatment of a cardiovascular impediment such as heart arrhythmias and angina pectoris. The compounds (I) may be administered orally or by intravenous injection. The pharmaceutical preparation of the compounds (I) may be in the form of oral preparations including tablets, capsules, powders, suspensions and syrups or injectable preparations including solutions and suspensions. The total daily dosage for adults is usually about 30–200 mg. in divided doses in case of oral administration.

The following examples are given to illustrate this invention, but are not intended to limit the scope of the invention in any sense.

EXAMPLE 1

5-(2-hydroxy-3-isopropylaminopropoxy)coumarin

A mixture of 0.50 g. of 5-(2,3-epoxypropoxy)coumarin, 15 ml. of ethanol and 0.7 g. of isopropylamine is heated at 100° C. in a sealed tube for 7 hours. The reaction mixture is concentrated under reduced pressure to dryness. The residue is recrystallized from a mixture of benzene and n-hexane to give 0.35 g. of the desired product melting at 103–104° C.

Analysis.—Calculated for $C_{15}H_{19}NO_4$ (percent): C, 64.96; H, 6.91; N, 5.05. Found (percent): C, 65.11; H, 7.00; N, 4.97.

EXAMPLE 2

8-(2-hydroxy-3-isopropylaminopropoxy)coumarin (1) A mixture of 1 g. of 8-(2,3-epoxypropoxy)coumarin, 30 ml. of ethanol and 1.35 g. of isopropylamine is heated at 100° C. in a sealed tube for 7 hours. The reaction mixture is concentrated under reduced pressure to dryness. The residue is recrystallized from a mixture of benzene and n-hexane to give 0.4 g. of the desired product melting at 106–107° C.

Analysis.—Calculated for $C_{15}H_{19}NO_4$ (percent): C, 64.96; H, 6.91; N, 5.05. Found (percent): C, 64.91; H, 7.47; N, 5.07.

(2) A mixture of 1 g. of 8-(2-hydroxy-3-chloropropoxy)coumarin, 0.6 g. of isopropylamine and 15 ml. of ethanol is heated at 100° C. in a sealed tube for 18 hours. The reaction mixture is concentrated under reduced pressure to dryness. The residue is dissolved in water. The solution is made alkaline by addition of an aqueous potassium carbonate and extracted with chloroform. The extract is washed with water and dried over anhydrous sodium sulfate and the solvent is distilled off. The residue is recrystallized from a mixture of benzene and n-hexane to give the desired product.

EXAMPLE 3

8-(2-hydroxy-3-t-butylaminopropoxy)coumarin

A mixture of 0.6 g. of 8-(2,3-epoxypropoxy)coumarin, 1 g. of t-butylamine and 30 ml. of ethanol is heated at 100° C. in a sealed tube for 8 hours. The reaction mixture is treated in the same procedure as in Example 1 to give the desired product melting at 100–101° C.

Analysis.—Calculated for $C_{16}H_{21}NO_4$ (percent): C, 65.95; H, 7.27; N, 4.81. Found (percent): C, 65.69; H, 7.25; N, 4.61.

EXAMPLE 4

8-(2-hydroxy-3-t-butylaminopropoxy)coumarin hydrochloride

A mixture of 3 g. of 8-(2-hydroxy-3-chloropropoxy)coumarin, 4.3 g. of t-butylamine and 60 ml. of ethanol is heated at 100° C. in a sealed tube for 15 hours. The reaction mixture is concentrated under reduced pressure to dryness. The residue is recrystallized from a mixture of ethanol and ether to give 2.1 g. of the desired product melting at 195–197° C.

Analysis.—Calculated for $C_{16}H_{22}NO_4Cl$ (percent): C, 58.35; H, 6.80; N, 4.20; Cl, 10.30. Found (percent): C, 58.62; H, 6.77; N, 4.27; Cl, 10.82.

EXAMPLE 5

3-methyl-8-(2-hydroxy-3-t-butylaminopropoxy)coumarin

A mixture of 1 g. of 3-methyl-8-(2,3-epoxypropoxy)coumarin, 1.6 g. of t-butylamine and 30 ml. of ethanol is heated at 115° C. for 7.5 hours. The reaction mixture is treated in the same procedure as in Example 1 to give the desired product melting at 105–106° C.

Analysis. Calculated for $C_{17}H_{23}NO_4$ (percent): C, 66.86; H, 7.59; N, 4.59. Found (percent): C, 66.81; H, 7.50; N, 4.40.

The desired product thus obtained is treated with hydrochloric acid to give the hydrochloride of the desired product melting at 194.5–196.5° C.

Analysis.—Calculated for $C_{17}H_{24}NO_4Cl$ (percent): C, 59.72; H, 7.08; N, 4.10; Cl, 10.37. Found (percent): C, 59.48; H, 7.24; N, 3.91; Cl, 10.41.

EXAMPLE 6

3-methyl-8-(2-hydroxy-3-isopropylaminopropoxy) coumarin hydrochloride

A mixture of 0.45 g. of 3-methyl-8-(2-hydroxy-3-chloropropoxy)coumarin, 0.5 g. of isopropylamine and 30 ml. of ethanol is heated at 100° C. in a sealed tube for 15 hours. The reaction mixture is concentrated under reduced pressure to dryness. The residue is recrystallized from isopropanol to give 0.35 g. of the desired product melting at 193–195° C.

Analysis.—Calculated for $C_{16}H_{22}NO_4Cl$ (percent): C, 58.62; H, 6.77; N, 4.27. Found (percent): C, 58.22; H, 6.70; N, 4.53.

EXAMPLE 7

3-methyl-8-(2-hydroxy-3-t-butylaminopropoxy) coumarin hydrochloride

A mixture of 0.5 g. of 3-methyl-8-(2-hydroxy-3-chloropropoxy)coumarin, 0.68 g. of t-butylamine and 30 ml. of ethanol is heated at 100° C. in a sealed tube for 17 hours. The reaction mixture is treated in the same procedure as in Example 6 to give the desired product melting at 196–198° C.

Analysis.—Calculated for $C_{17}H_{24}NO_4Cl$ (percent): C, 59.72; H, 7.08; N, 4.10; Cl, 10.37. Found (percent): C, 59.86; H, 7.28; N, 4.54; Cl, 10.03.

EXAMPLE 8

5-(2-hydroxy-3-isopropylaminopropoxy)-4,7-dimethylcoumarin

A mixture of 2.5 g. of 5-(2,3-epoxypropoxy)-4,7-dimethylcoumarin, 3 g. of isopropylamine and 50 ml. of ethanol is heated at 100° C. in a sealed tube for 8 hours. After the completion of the heating, the reaction mixture is concentrated under reduced pressure to dryness. The residue is recrystallized from a mixture of benzene and n-hexane to give the desired product melting at 131–133° C.

Analysis.—Calculated for $C_{17}H_{23}NO_4$ (percent): C, 66.86; H, 7.59; N, 4.59. Found (percent): C, 66.84; H, 7.69; N, 4.58.

EXAMPLE 9

5-(2-hydroxy-3-t-butylaminopropoxy)-4,7-dimethylcoumarin (1) A mixture of 2.5 g. of 5-(2,3-epoxypropoxy)-4,7-dimethylcoumarin, 3.5 g. of t-butylamine and 50 ml. of ethanol is heated at 100° in a sealed tube for 8 hours. After completion of the heating, the reaction mixture is concentrated under reduced pressure to dryness. The residue is recrystallized from benzene to give the desired product melting at 135–136° C.

Analysis.—Calculated for $C_{18}H_{25}NO_4$ (percent): C, 67.69; H, 7.89; N, 4.39. Found (percent): C, 68.05; H, 7.87; N, 4.35.

(2) A mixture of 1 g. of 5-(2-hydroxy-3-chloropropoxy)-4,7-dimethylcoumarin, 0.6 g. of t-butylamine and 30 ml. of ethanol is heated at 100° C. in a sealed tube for 18 hours. After completion of the heating, the reaction mixture is concentrated under reduced pressure to dryness. The residue is dissolved in water. The solution is made alkaline by addition of an aqueous potassium carbonate and extracted with chloroform. The extract is washed with water and dried over anhydrous sodium sulfate and the solvent is distilled off. The residue is recrystallized from benzene to give the desired product melting at 135–136° C.

EXAMPLE 10

5-methyl-8-(2-hydroxy-3-isopropylaminopropoxy) coumarin

A mixture of 5 g. of 5-methyl-8-(2-hydroxy-3-chloropropoxy)coumarin, 6.6 g. of isopropylamine and 120 ml. of ethanol is heated at 100° C. in a sealed tube for 18 hours. After completion of the heating, the reaction mixture is concentrated under reduced pressure to dryness. The residue is recrystallized from a mixture of isopropanol and ethanol to give 3 g. of the desired product melting at 189–191° C. (decomp.).

Analysis.—Calculated for $C_{16}H_{22}NO_4Cl$ (percent): C, 58.62; H, 6.77; N, 4.27; Cl, 10.82. Found (percent): C, 58.34; H, 6.79; N, 4.14; Cl, 10.63.

EXAMPLE 11

5-methyl-8-(2-hydroxy-3-t-butylaminopropoxy) coumarin

A mixture of 5 g. of 5-methyl-8-(2-hydroxy-3-chloropropoxy)coumarin, 8.15 g. of t-butylamine and 120 ml. of ethanol is heated at 100° C. in a sealed tube for 15.5 hours. After completion of the heating, the reaction mixture is concentrated under reduced pressure to dryness. The residue is recrystallized from isopropanol to give 3.5 g. of the desired product melting at 211–212° C. (decomp.).

Analysis.—Calculated for $C_{17}H_{24}NO_4Cl$ (percent): C, 59.73; H, 7.08; N, 4.10; Cl, 10.37. Found (percent): C, 59.52; H, 7.04; N, 3.95; Cl, 10.21.

What is claimed is:

1. A compound selected from the group consisting of a compound having the formula

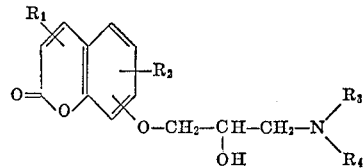

wherein $R_1$, $R_2$ and $R_3$ may be the same or different and each represents a hydrogen atom or a lower alkyl group, $R_4$ represents a lower alkyl group, and the group

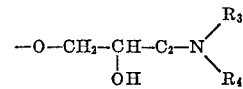

is substituted in the 5- or 8-position of the coumarin ring, and a pharmaceutically acceptable acid addition salt thereof.

2. A compound selected from the group consisting of a compound having the formula

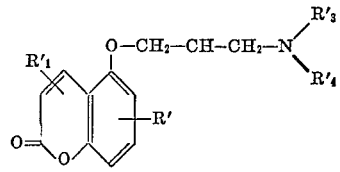

wherein $R'_1$, $R'_2$ and $R'_4$ may be the same or different and each represents a lower alkyl group, and $R'_3$ represents a hydrogen atom or a lower alkyl group, and a pharmaceutically acceptable acid addition salt thereof.

3. 5-(2-hydroxy-3-isopropylaminopropoxy)coumarin.
4. 8-(2-hydroxy-3-isopropylaminopropoxy)coumarin.
5. 8-(2-hydroxy-3-t-butylaminopropoxy)coumarin.

6. 3-methyl-8-(2-hydroxy - 3 - isopropylaminopropoxy) coumarin.

7. 3-methyl - 8 - (2 - hydroxy-3-t-butylaminopropoxy) coumarin.

8. 5 - (2 - hydroxy - 3 - isopropylaminopropoxy)-4,7-dimethylcoumarin.

9. 5 - (2 - hydroxy-3-t-butylaminopropoxy) - 4,7 - dimethylcoumarin.

10. 5 - methyl-8-(2-hydroxy - 3 - isopropylaminopropoxy)coumarin.

11. 5-methyl - 8 - (2 - hydroxy-3-t-butylaminopropoxy) coumarin.

References Cited
UNITED STATES PATENTS

| | | | |
|---|---|---|---|
| 3,410,851 | 11/1968 | Stauffer | 260—345.2 XR |
| 3,147,258 | 9/1964 | Da Re | 260—345.2 XR |
| 3,075,996 | 1/1963 | Raue | 260—343.2 |
| 2,945,033 | 7/1960 | Hausermann | 260—343.2 XR |

JOHN M. FORD, Primary Examiner

U.S. Cl. X.R.

424—279

UNITED STATES PATENT OFFICE
CERTIFICATE OF CORRECTION

Patent No. 3,663,570    Dated May 16, 1972

Inventor(s)   YASUNOBU SATO et al

It is certified that error appears in the above-identified patent and that said Letters Patent are hereby corrected as shown below:

Column 4, line 40 - "presure" should be written as

---pressure---.

Column 8 - Claim 1 - line 50 - formula should be written as

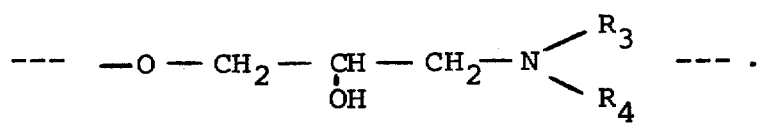

UNITED STATES PATENT OFFICE
CERTIFICATE OF CORRECTION

Patent No. 3,663,570      Dated May 16, 1972

Inventor(s) YASUMOBU SATO et al

It is certified that error appears in the above-identified patent and that said Letters Patent are hereby corrected as shown below:

Column 8 - Claim 2 - the formula should be written as

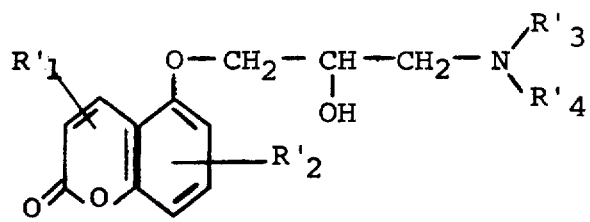

Signed and sealed this 18th day of June 1974.

(SEAL)
Attest:

EDWARD M. FLETCHER, JR.
Attesting Officer

C. MARSHALL DANN
Commissioner of Patents